April 9, 1935. F. BOSWORTH ET AL 1,996,949
MEAT TENDERER
Filed June 5, 1933
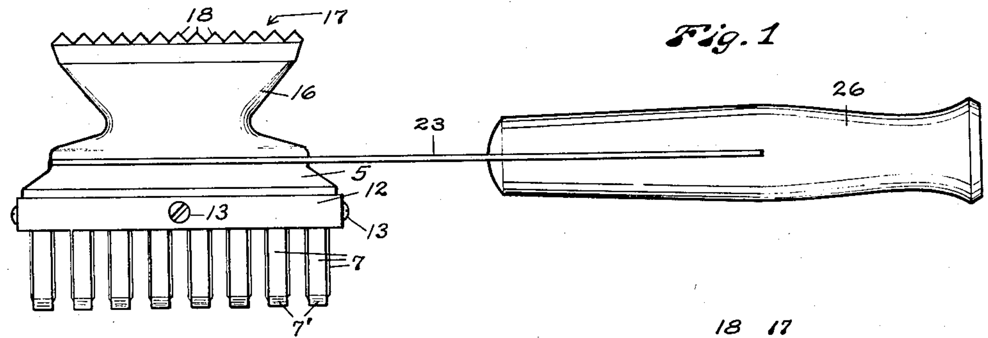
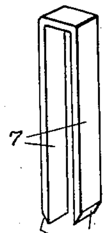
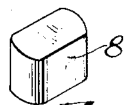
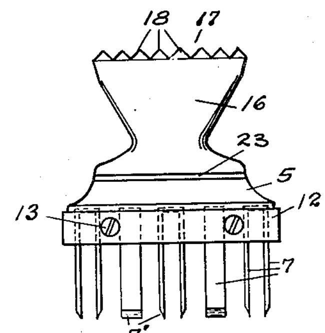
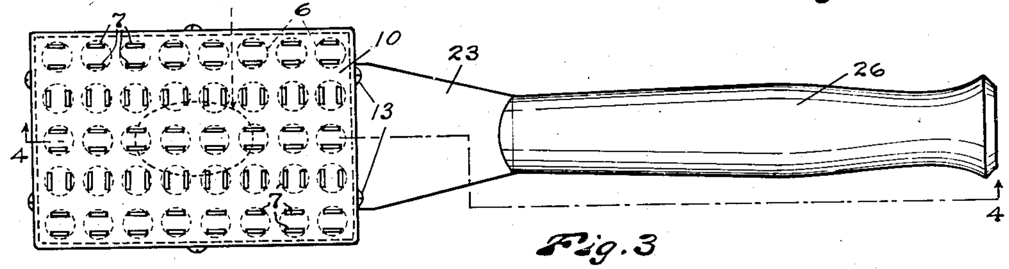
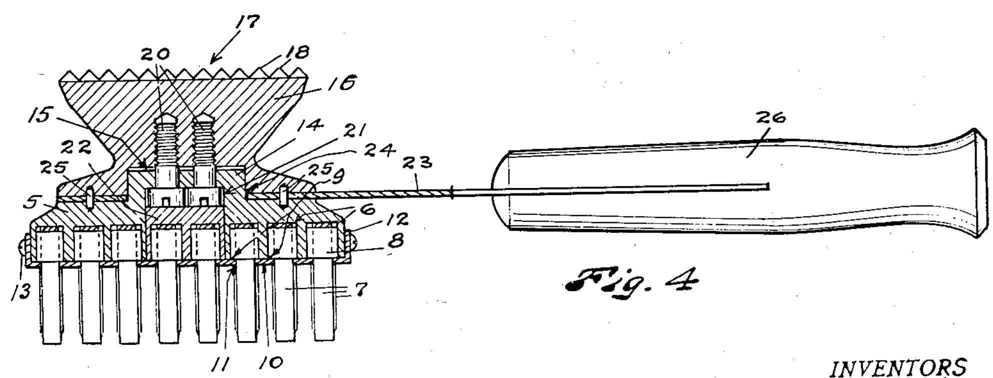
INVENTORS
Fay Bosworth
Frederick W. Geisert
By Fred C. Matheny
ATTORNEY Patented Apr. 9, 1935

1,996,949

UNITED STATES PATENT OFFICE 1,996,949

MEAT TENDERER

Fay Bosworth, Kirkland, and Frederick W. Geisert, Seattle, Wash.; said Geisert assignor to said Bosworth Application June 5, 1933, Serial No. 674,428

7 Claims. (Cl. 17—30)

This invention relates to meat tenderers of a type adapted for hand use on steaks and similar cuts of meat to render the same more tender preparatory to cooking.

The general objects of this invention are to provide a meat tenderer of this nature which is simple in construction, not expensive to manufacture, highly efficient in the tendering of meats and easy to operate.

Another object is to provide a meat tendering device having a multiplicity of blades positioned at different angles whereby the meat will be cut in different directions in the process of tendering the same.

Another object is to provide a meat tendering device having a multiplicity of cutter members of U shape construction each affording two relatively long, thin narrow blades, said cutter members being detachably secured to a head whereby they may be replaced when they become worn or broken.

Another object is to provide a meat tenderer of this nature in which the two blades of each cutter member are arranged substantially parallel with each other and are beveled on their outer sides, in sharpening, whereby they may be withdrawn more easily from the meat and will not tend to pick up or hold the meat.

Another object is to provide a meat tendering device of this nature in which the handle is formed of resilient material whereby there will be less shock to the hand and arm of the operator and less danger of driving the knives of the tenderer into the chopping block on which the meat rests than there would be if a non-resilient handle were used.

Another object is to provide a meat cubing or pounding device in combination with this meat tendering device whereby it is readily available for cubing and shaping a piece of meat which has been tendered.

Other and more specific objects of the invention will be apparent from the following description taken in connection with the accompanying drawing.

In the drawing Figure 1 is a side elevation of a meat tendering device constructed in accordance with my invention.

Fig. 2 is an end view of the same.

Fig. 3 is a plan view showing the arrangement of the knives on the tendering device.

Fig. 4 is a cross section on broken line 4—4 of Fig. 3.

Fig. 5 is a detached perspective of one of the cutters.

Fig. 6 is a detached perspective view of one of the key members used in holding the cutters.

Like reference numerals designate like parts throughout the several views.

In the drawing 5 designates a head member having a plurality of cavities 6 in the face thereof. These cavities 6 may be arranged in longitudinal and transverse rows, as shown, and each cavity is adapted for the reception of the closed end of a U shaped cutter member which is preferably formed of a relatively long thin piece of steel of narrow width bent double to afford two substantially parallel spaced apart blades 7. A key member 8 is provided within the closed end of each cutter member between the blades 7. These keys 8 are large enough so that they are substantially flush with the face of the head member 5 and the ends of these keys project beyond the sides of the blades 7 to afford shoulders 9 which are engaged by a face plate 10 whereby the cutter members are removably secured to the head member 5. The face plate 10 has slots 11 which fit over the blades 7 and position these blades as well as holding the same in assembled relation in the head member 5. The face plate 10 may have a marginal flange 12 which extends upwardly over the sides of the head member 5 and is secured to said head member 5 by screws 13.

The cavities 6 in the head member 5 are preferably positioned in rows both lengthwise and crosswise of the head member and the slots 11 in the face plate 10 are preferably arranged so that they position the sets of blades of alternate double rows at substantially right angles to each other. For instance in the meat tenderer shown in the drawing the blades 7 in some of the rows are positioned in planes extending lengthwise of the head 5 while the blades 7 of other rows are positioned in planes extending crosswise of the head 5. It is highly desirable to position the blades 7 at different angles with some of the blades at substantially right angles to other blades so that meat which is being tendered will be cut in at least two different directions. This insures that the meat will always be cut crosswise of or at an angle to the grain of said meat. It is not essential, however, that the blades should be arranged in rows nor that all of the blades in a row should be positioned in the same plane, as obviously the blades may be in staggered relation and may be positioned at various different angles.

The two blades 7 of each cutter member are relatively long and thin and narrow and the outer ends of said blades are preferably formed at right angles to the length of the blades and these outer ends are sharpened to a knife edge by beveling them on the outer sides as at 7'. This leaves the inner opposed sides of the two blades of each U shaped cutter member substantially plane and parallel so that when they are driven into the meat there will be no tendency to compress the meat between the two blades and the blades will withdraw easily and without picking up any pieces of the meat.

The side of the head member 5 opposite to the blades 7, is provided with an outwardly protruding boss 14 which is adapted to fit within a recess 15 in a meat cubing element 16. The meat cubing [illegible]

ing approximately in a common plane, the outer ends of said blades being formed at substantially right angles to the length of the blades and being sharpened to a knife edge and face plate means having slots disposed at substantially right angles to each other and fitted over said blades and positioning said blades non-rotatively in said head, whereby, the knife edges of certain of said blades extend substantially at right angles to the knife edges of other of said blades.

2. In a meat tendering device, a head, a plurality of relatively long thin blades of narrow width arranged in rows and projecting outwardly from said head and face plate means having a [illegible]

[illegible]

7. In a meat tendering device for striking meat which rests on a block, a relatively flat handle member of resilient spring steel, a hand hold connected with one end portion of said resilient handle member, two independent meat striking head members positioned on opposite sides of the other end portion of said resilient flat handle member and extending in opposite directions from the plane of said resilient flat handle member, whereby said flat handle member will yield resiliently when blows are struck with either of said meat striking heads, and damage to said block will be minimized, and means rigidly securing said two head members together whereby said handle is securely clamped therebetween.

FAY BOSWORTH.
FREDERICK W. GEISERT.